US008547063B2

(12) United States Patent
Krancher et al.

(10) Patent No.: US 8,547,063 B2
(45) Date of Patent: Oct. 1, 2013

(54) POWER SUPPLY SYSTEM FOR AN ELECTRONIC DEVICE

(75) Inventors: Robert Krancher, Houston, TX (US); Brian Ryder, Tornball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 12/769,769

(22) Filed: Apr. 29, 2010

(65) Prior Publication Data

US 2011/0266997 A1 Nov. 3, 2011

(51) Int. Cl.
*H02J 7/00* (2006.01)
*H02J 7/02* (2006.01)

(52) U.S. Cl.
USPC ............ 320/114; 320/111; 320/113; 320/115

(58) Field of Classification Search
CPC ...................................................... H02J 7/0042
USPC ........................................................ 320/107
See application file for complete search history.

(56) References Cited

U.S. PATENT DOCUMENTS

| 6,046,571 A * | 4/2000 | Bovio et al. .................... 320/113 |
| 6,392,383 B1 * | 5/2002 | Takimoto et al. ............. 320/115 |
| 7,209,738 B2 * | 4/2007 | Griffith et al. ............. 455/426.1 |
| 7,417,685 B2 * | 8/2008 | Tsuji ............................. 348/375 |
| 7,480,139 B2 | 1/2009 | Ryder et al. |
| 2006/0082959 A1 * | 4/2006 | DeLuga et al. ............... 361/683 |

FOREIGN PATENT DOCUMENTS

| CN | 2711973 | 7/2005 |
| WO | WO2009143737 | 12/2009 |

OTHER PUBLICATIONS

90-Watt-Hour Universal Notebook Battery (UPB90) User Manual pp. 2.
MyPower All Plus External Laptop Battery: MP3700/MP3450-10 User Guide, pp. 20.
Nokia E72 Accessories: HHI 8800mAh Universal External Back up Battery, http://www.handhelditems.com/8800mah-universal-laptop-cell-phone-external-back-p-103009.html.
Dell- 45 WHr 9-Cell Lithium-ion Battery Slice, pp. 1, URL: http://accessories.us.dell.com/sna/products/Power/productdetail.aspx?c=us&l=en&cs<19&sku=312-0652.

* cited by examiner

*Primary Examiner* — Edward Tso
*Assistant Examiner* — Ahmed Omar
(74) *Attorney, Agent, or Firm* — Arthur Ortega

(57) ABSTRACT

A power supply system for an electronic device which includes a power source, a docking mechanism configured to dock a first electronic device, a docking connector configured to provide power from the power source to the first electronic device when it is docked to the docking mechanism, and a power output port configured to provide power from the power source to a second electronic device without having the second electronic device docked.

14 Claims, 2 Drawing Sheets

POWER SUPPLY SYSTEM FOR AN ELECTRONIC DEVICE

BACKGROUND

An electronic device, such as a notebook computer, often contains an internal power supply, such as a battery, to power the electronic device. An external power supply, such as a battery, can be used to provide additional power to the electronic device. Improvements in techniques to provide power to electronic devices are desirable.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In some embodiments of the invention, disclosed is a power supply system capable of providing power to an electronic device with a docking mechanism and to another electronic device without a docking mechanism. For example, the power supply can provide power to a notebook computer via a docking mechanism and can provide power to another electronic device such as a portable music player via a universal serial bus (USB) interface. In this way, a user may only need to maintain a single power supply for multiple electronic devices.

Figure 1:
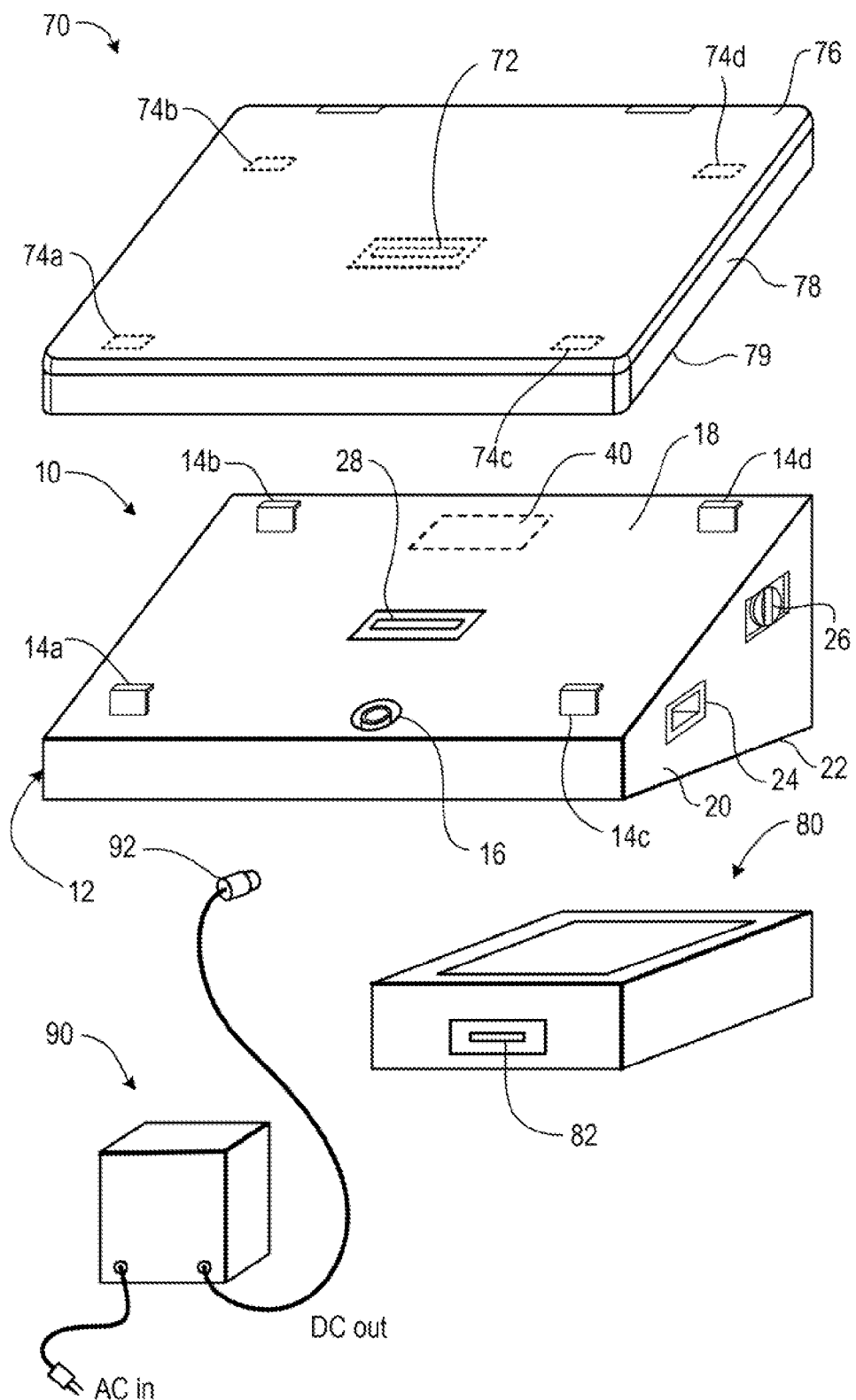
FIG. 1 is a perspective view of an embodiment of a power supply system for an electronic device, constructed in accordance with at least some illustrative embodiments.

Referring now in more detail to the drawings in which like numerals indicate corresponding parts throughout the views, FIG. 1 shows a power supply system 10 having a power source 40 configured to provide power to various electronic devices. In one embodiment, the power supply system 10 can provide power to a first electronic device 70 and a second electronic device 80. Although two electronic devices are shown, it should be understood that the power supply system 10 is capable of providing power to a greater number of electronic devices. The power supply system 10 includes a docking mechanism 14 (for example, comprising locking hooks 14a, 14b, 14c, 14d) which allows it to be detachably coupled to a docking mechanism 74 (for example, comprising recessed areas 74a, 74b, 74c, 74d) of the first electronic device 70. The system 10 includes a docking connector 28 which is configured to provide power from the power source 40 through connector 72 of the first electronic device 70 when it is docked to the docking mechanism 14 of the system 10. The system 10 includes a power output port 24 configured to provide power from the power source 40 to the second electronic device 80 when it is coupled to the system 10, but without having the device 80 docked to the system 10. The system 10 includes a power input port 16 configured to couple to connector 92 of external power supply 90 and receive an external source of power from the power supply 90.

The power supply system 10 is shown as having a housing 12 to support the system and includes a top surface 18, bottom surface 22, and side surfaces 20. The power output port 24 is shown disposed on side surface 20, but can be disposed on any other surface of the housing 12. The power output port 24 can be, for example, a USB connector and corresponding interface, but it should be understood that any other type of connector can be utilized. The power source 40 can be a rechargeable battery or any other power source that can be recharged. The power input port 16 is disposed on the top surface 18 of the housing 12 and is configured to receive power from an external power supply to recharge the power source 40 (e.g., rechargeable battery). The docking connector 28 is disposed on the top surface 18 of the housing 12 and configured to receive from the first electronic device 70 power which can be used to recharge the power source 40, when it is a rechargeable battery. In some embodiments, the docking connector 28 is configured to receive data signals from the first electronic device 70 and forward the data signals to the power output port 24 and to the second electronic device 80. The docking mechanism 14 is shown partially disposed on the top surface 18 of the housing 12.

In one embodiment, the first electronic device 70 is shown as a notebook computer having a base member 78 rotatably coupled to a display member 76. The base member 78 can include a processor and memory for executing operations of the computer. The base member 78 can also include a keyboard and other input output devices for interacting with the computer. The display member 76 includes a display device such as a liquid crystal display (LCD) display. The docking connector 72 of the electronic device 70 is disposed on a bottom surface 79 of the base member 78 for communicative engagement with corresponding docking connector 28 on the top surface 18 of the supply system 10. Thus, connectors 72 and 28 enable power and/or other signals to be communicated between power supply system 10 and electronic device 70. When the electronic device 70 and power supply system 10 are coupled together and docked to each other, the system 10 can provide a recharge current to the device to facilitate recharging of any internal power supply of the device. In some embodiments, a rechargeable battery of the power system 10 can be recharged by electronic device 70 while docked to each other. The device 70 can be an external device and removably coupled. The device 70 is referred to as "external" because it is external to, and separate from, supply system 10.

In one embodiment, the locking mechanism 14 comprises movable locking hooks 14a, 14b, 14c and 14d extending upwardly from the top surface 18 of the power supply system 10 to engage corresponding locking mechanism 74 of the first electronic device 70. For example, the locking mechanism 74 can be recessed areas 74a, 74b, 74c and 74d disposed on the bottom surface 79 of the first electronic device 70. According to some embodiments, locking hooks 14a, 14b, 14c and 14d can be biased to releaseably secure power supply system 10 to the first electronic device 70 and movable away from their biased state in response to movement of release mechanism (button) 26 disposed on side surface 20 of the system 10. For example, when coupling the power supply system 10 to the first electronic device 70, locking hooks 14a, 14b, 14c and 14d are insertable into recessed areas 74a, 74b, 74c and 74d to securely fasten power supply 10 to electronic device 70 in a locked position (locking hooks 14a, 14b, 14c and 14d are oriented within recessed areas 74a, 74b, 74c and 74d to prevent removal of hooks 14a, 14b, 14c and 14d from recessed areas 74a, 74b, 74c and 74d and thus prevent separation of electronic device 70 from power supply 10).

To release the power system 10 from the first electronic device 70, release button 26 is actuated to move hooks 14a, 14b, 14c and 14d to an unbiased or unlocked position (e.g., to position locking hooks 14a, 14b, 14c and 14d within recessed areas 74a, 74b, 74c, 74d to enable removal of hooks 14a, 14b, 14c and 14d from recessed areas 74a, 74b, 74c and 74d) to facilitate detachment of the power supply system 10 from the electronic device 70. It should also be understood that locking mechanism 14 may be otherwise configured to securely fasten power supply system 10 to electronic device 70, such as for example, including a greater or fewer number of locking hooks 14a, 14b, 14c and/or 14d or utilizing other methods of attachment.

In one embodiment, the second electronic device 80 is shown as a portable electronic device. The device 80 can be an external device and removably coupled. The device 80 is referred to as "external" because it is external to, and separate from, supply system 10. The device 80 may perform any one or more of a variety of functions. In some embodiments, the external device can be a media player (e.g., MP3 player) and may be portable. The device 80 can be a battery-operated device and thus have rechargeable batteries that can be recharged by, for example, the supply system 10. The device 80 comprises a connector 82 which mates with corresponding externally-accessible power port 24 of the system 10 to thereby permit the device 80 to also be connected to the first electronic device 70. In some embodiments, the connector 82 of the device 80 connects directly to the power port 24 of the system 10. In other embodiments, an electrical cable (not shown) connects the device 80 to the port 24 of the system 10. In at least some embodiments, the device 80 comports with the USB protocol and, as such, couples to a USB port (port 24) on the system 10. The communication protocol, however, can be other than the USB protocol as desired. When coupled to the system 10, the second electronic device 80 can receive data from the first electronic device 70. The system 10 also can provide DC power to the device 80 which can be used by the device to operate its own electronics and/or charge its internal rechargeable battery.

The external power supply 90 can be any device capable of providing an external power source to the power supply system 10. In one embodiment, the power supply 90 can receive alternating current (AC) from an AC source, such as power outlet, and convert the AC current to a direct current (DC). The DC current can be provided to supply system 10 and used by the system to recharge its power source 40, such as when it is a rechargeable battery.

Figure 2:
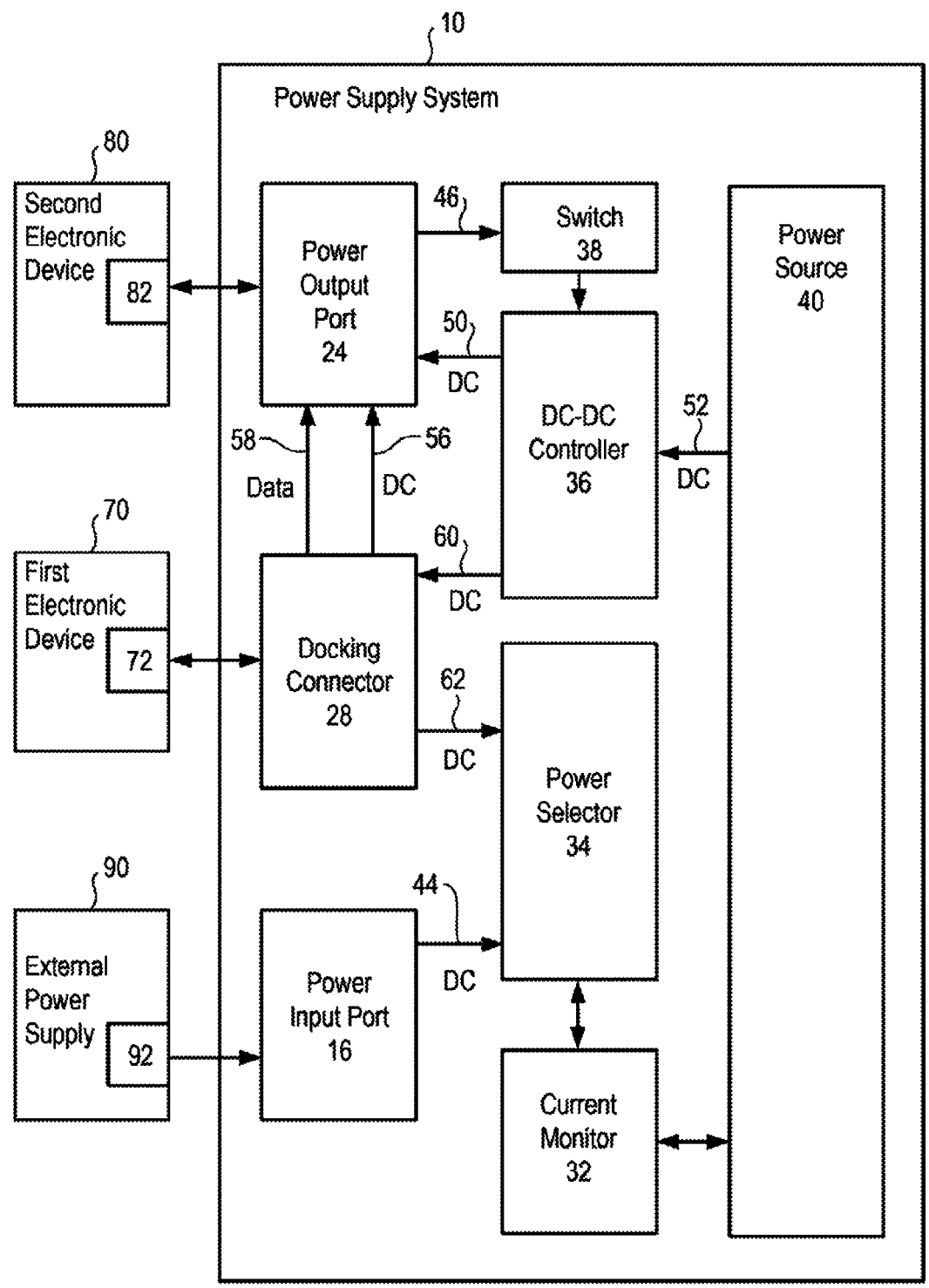
FIG. 2 is a block diagram of the power supply system for an electronic device identified in FIG. 1, constructed in accordance with at least some illustrative embodiments.

FIG. 2 is a block diagram of the power supply system 10 for an electronic device identified in FIG. 1, constructed in accordance with at least some illustrative embodiments. In one embodiment, the power source 40 can be a rechargeable battery and can be recharged by the first electronic device 70 or external power supply 90. The rechargeable battery can comprise a plurality of battery cells and corresponding cell monitors. The system 10 includes a power selector 34 that can select between DC input power (Over signal line 62) received at docking connector 28 or DC input power (over signal line 44) received at power input port 16. The DC power received at power input port 16 can be supplied from external power supply 90 via connector 92 of the power supply 90. The DC power received at the docking connector 28 can be supplied from the first electronic device 70 via connector 72 of the device. The output from the power selector 34 is supplied to current monitor 32. The current monitor 32 monitors the DC current from the power selector 34 to maintain a stable DC current to recharge the power source (battery).

In some embodiments, if the first electronic device 70 and the external power supply 90 are connected to the supply system 10, then the power selector 34 can be configured to have the power input from electronic device 70 override the power input from the external power supply 90. Therefore, when the power source 40 is a rechargeable battery, it can be recharged from power supplied from either the first electronic device 70 or the external power supply 90. It should be understood, though, that the power source 40 can be a fuel cell or other power source technology.

In one embodiment, the system 10 can supply power to the first electronic device 70. In the embodiment shown, the system 10 includes a DC-DC controller 36 which can be configured to receive a DC output level (over DC line 52) from power source 40 and adjust it to a DC level appropriate for the first electronic device 70 (or the second electronic device 80). The DC output from the DC-DC convertor 36 is supplied (over DC signal line 60) to the first electronic device 70 (via docking connector 28 of system 10 and docking connector 72 of device 70). Therefore, in one embodiment, the system 10 is configured to supply power to the first electronic device 70 when the device 70 is coupled and docked to the system 10. The electronic device 70 can use the power from the system 10 to power its components as well as recharge any internal rechargeable battery power source.

In another embodiment, the system 10 can also supply power to the second electronic device 80. The system 10 includes a switch 38 which detects when the device 80 is coupled to power output port 24. The switch 38 can be a mechanical switch or a semiconductor switch or other mechanism that detects when a device is coupled to power port 24 (e.g., auto-sensing function). When the second electronic device 80 is coupled to power output port 24, the power port sends a signal (over signal line 46) to switch 38 which detects this event and causes the DC-DC controller 36 to supply DC power to power port 24 over DC signal line 50. The power port 24 can be a USB port with an appropriate interface. For example, the power port 24 can include power signals (+5 volts and Ground). The power port 24 can also include differential data signals (D+ and D−). Therefore, in one embodiment, the system 10 is configured to supply power to the second electronic device 80 which can use the power to power its components as well as recharge any internal rechargeable battery power source.

In some embodiments, the power supply system 10 can provide data signals from the first electronic device 70 to the second electronic device 80. For example, the system 10 may configure docking connector 28 to receive data signals from connector 72 of electronic device 70. Further, the system 10 may configure docking connector 28 to forward these data signals to power port 24 (over data signal line 58) and to the second electronic device 80.

Advantages may be provided by embodiments of the invention. In one embodiment, the first electronic device 70 can be a notebook computer, the second electronic device 80 can be portable music player with a USB connector, and the power output port 24 of the power supply system 10 can be a USB compatible port. In this example, the power supply system 10 of the present invention can be operate as an extended notebook battery and provide an accessory charging port which can be used independent of the notebook computer. For example, this may allow a user to disconnect the battery from the notebook computer and use it standalone with the portable music player via the USB port. Thus, a user can extend the battery life of their personal electronic devices using the extended battery independent of the notebook computer via the USB port. The extended battery may also reduce the need to maintain multiple power sources for multiple devices.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power supply system for an electronic device comprising:
   a power source comprising a rechargeable battery;
   a docking mechanism configured to dock a first electronic device;
   a docking connector configured to provide power from the power source to the first electronic device when it is docked to the docking mechanism, wherein the docking connector is configured to receive power from the first electronic device to recharge the rechargeable battery; and
   a power output port configured to provide power from the power source to a second electronic device without having the second electronic device docked.

2. The power supply system of claim 1, further comprising a power input port configured to receive power from an external power supply to recharge the rechargeable battery.

3. The power supply system of claim 1, further comprising a power selector switch configured to select the docking connector or the power input port to provide power to recharge the battery.

4. The power supply system of claim 1, wherein the power output port comprises a universal serial bus (USB) interface.

5. The power supply system of claim 1, wherein the docking connector is configured to receive data signals from the first electronic device and forward the data signals to the power output port.

6. The power supply system of claim 1, wherein the docking mechanism and the docking connector are partially disposed on a top surface of a housing to support the power supply system.

7. A power supply system comprising:
   means for providing power to a first electronic device when it is docked to the system;
   means for providing power to a second electronic device without having the second electronic device docked to the system, wherein the means for providing power to the first electronic device or the second electronic device comprises a rechargeable battery; and
   a means for receiving power from an the first electronic device to recharge the rechargeable battery.

8. The power supply system of claim 7, further comprising a means for docking the first electronic device to the power supply system.

9. The power supply system of claim 8, wherein the docking means is partially disposed on a top surface of a housing to support the power supply system.

10. The power supply system of claim 7, further comprising a means for receiving data signals from the first electronic device and forwarding the data signals to the second electronic device.

11. A method of manufacturing a power supply system for an electronic device comprising:
    providing a means for supplying power to a first electronic device when it is docked to the system;
    providing a means for supplying power to a second electronic device without having the second electronic device docked to the system, wherein supplying power to the first electronic device or the second electronic device comprises a rechargeable battery; and
    providing a means for receiving power from the first electronic device to recharge the rechargeable battery.

12. The method of claim 11, further comprising providing a means for docking the first electronic device to the power supply system.

13. The method of claim 12, wherein the docking means is partially disposed on a top surface of a housing to support the power supply system.

14. The method of claim 11, further comprising providing a means for receiving data signals from the first electronic device and forwarding the data signals to the second electronic device.

\* \* \* \* \*

UNITED STATES PATENT AND TRADEMARK OFFICE
CERTIFICATE OF CORRECTION

| | | |
|---|---|---|
| PATENT NO. | : 8,547,063 B2 | Page 1 of 1 |
| APPLICATION NO. | : 12/769769 | |
| DATED | : October 1, 2013 | |
| INVENTOR(S) | : Robert Krancher et al. | |

It is certified that error appears in the above-identified patent and that said Letters Patent is hereby corrected as shown below:

In the Claims:

In column 6, line 9, in Claim 7, delete "an the" and insert -- the --, therefor.

Signed and Sealed this
Third Day of December, 2013

Margaret A. Focarino
*Commissioner for Patents of the United States Patent and Trademark Office*